United States Patent
Taylor et al.

(10) Patent No.: US 6,758,511 B2
(45) Date of Patent: Jul. 6, 2004

(54) VEHICLE LATCH MECHANISM FOR CONVERTIBLE TOPS

(75) Inventors: Kim E. Taylor, Farmington Hills, MI (US); Michael T. Willard, Harrison Township, MI (US); Michael P. Alexander, Grosse Ile, MI (US); Stephen A. Doncov, Trenton, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/209,672

(22) Filed: Jul. 31, 2002

(65) Prior Publication Data

US 2004/0021339 A1 Feb. 5, 2004

(51) Int. Cl.[7] .................................................. B60J 7/85
(52) U.S. Cl. ................................ 296/121; 292/DIG. 5
(58) Field of Search ........................... 296/107.01, 108, 296/121, 107.17; 292/DIG. 5

(56) References Cited

U.S. PATENT DOCUMENTS

| | | | |
|---|---|---|---|
| 2,935,350 A | 5/1960 | Bestrom | |
| 4,441,345 A | 4/1984 | Guarr | |
| 4,712,828 A | 12/1987 | Albrecht | |
| 4,815,775 A | 3/1989 | Mertin et al. | |
| 5,035,463 A | 7/1991 | Kato et al. | |
| 5,046,767 A | 9/1991 | Muscat | |
| 5,052,740 A | 10/1991 | Bauer et al. | |
| 5,154,479 A | 10/1992 | Sautter, Jr. | |
| 5,269,586 A | 12/1993 | Hahn et al. | |
| 5,284,378 A | 2/1994 | Sautter, Jr. | |
| 5,413,390 A | 5/1995 | Filippi | |
| 5,429,400 A | 7/1995 | Kawaguchi et al. | |
| 5,435,615 A | 7/1995 | Schmitz | |
| 5,595,407 A | 1/1997 | ter Horst et al. | |
| 5,624,149 A | 4/1997 | Tokarz | |
| 5,645,309 A | 7/1997 | Graf | |
| 5,722,704 A | 3/1998 | Chaput et al. | |
| 5,755,467 A | 5/1998 | Dilluvio et al. | |
| 5,772,275 A | 6/1998 | Tokarz | |
| 5,839,778 A | * 11/1998 | Schaible et al. | ............ 296/121 |
| 5,904,394 A | 5/1999 | Dilluvio et al. | |
| 6,033,008 A | 3/2000 | Mattila | |
| 6,042,174 A | 3/2000 | Durrani | |
| 6,155,614 A | 12/2000 | Lange | |
| 6,158,786 A | 12/2000 | Droste et al. | |
| 6,168,224 B1 | 1/2001 | Henn et al. | |
| 6,182,527 B1 | 2/2001 | Sander | |
| 6,213,534 B1 | 4/2001 | MacFarland | |
| 6,227,604 B1 | 5/2001 | Grace | |
| 6,419,297 B2 * | 7/2002 | Haberl et al. | ................ 296/121 |
| 6,520,560 B2 * | 2/2003 | Schutt et al. | ................ 296/121 |
| 2001/0005090 A1 | 6/2001 | Haberl et al. | |

FOREIGN PATENT DOCUMENTS

DE    44 15 969 A1    9/1995

OTHER PUBLICATIONS

4–Pages of Photos of 2000 Model Year, Mercedes SLK Convertible Top Latch Mechanism.

* cited by examiner

Primary Examiner—Jason Morrow
(74) Attorney, Agent, or Firm—Harness, Dickey & Pierce, P.L.C.

(57) ABSTRACT

A latch mechanism associated with one of a convertible top and a automobile component is provided. The latch mechanism is adapted to cooperate with an engagement member associated with the other of the convertible top and the automobile component. A hook, a first guide pin and a second guide pin are provided. The first and second guide pins are associated with the hook. A first guide slot is associated with the first guide pin and a second guide slot is associated with the second guide pin. A drive mechanism is associated with the latch assembly and adapted to move each of the first and second guide pins along its respective first and second guide slot to move the hook between a latched position and an unlatched position.

26 Claims, 14 Drawing Sheets

VEHICLE LATCH MECHANISM FOR CONVERTIBLE TOPS

FIELD OF THE INVENTION

The present invention relates generally, to a vehicle roof latching device; and more particularly, to such a device for securing a convertible top, hard top, or cover to a vehicle body.

BACKGROUND AND SUMMARY OF THE INVENTION

Passenger vehicles having removable or retractable roof components to open the passenger compartment to the sky (hereinafter referred to as a "convertible top") have been manufactured for many years. Recently, vehicles having convertible tops have become more popular with purchasers. Consequently automobile manufacturers are manufacturing a greater variety of vehicles with convertible tops. Latches used with these convertible tops, however, can be complicated and/or relatively large.

In accordance with the present invention, a latch mechanism associated with one of a convertible top and a automobile component is provided. The latch mechanism is adapted to cooperate with an engagement member associated with the other of the convertible top and the automobile component. In another aspect of the present invention, a hook, a first guide pin and a second guide pin are provided. The first and second guide pins are associated with the hook. A first guide slot is associated with the first guide pin and a second guide slot is associated with the second guide pin. Another aspect of the present invention includes a drive mechanism associated with the latch assembly and adapted to move each of the first and second guide pins along its respective first and second guide slot to move the hook between a latched position and an unlatched position.

In still another aspect of the present invention, a hook is associated with a guide slot and a guide pin. A drive mechanism is adapted to drive the guide pin along the guide slot. The drive mechanism has a pair of elongated pivot arms aligned, spaced apart and adapted to accommodate a drive link centrally located between the pair of pivot arms and attached to each of the pivot arms. The pair of pivot arms having a longitudinal axis which is substantially parallel to the axis corresponding to the path the hook takes when the latch mechanism is in the latched position.

In yet another aspect of the present invention, a hook plate including a hook, a guide slot and a pin opening is provided. A pair of pivot arms with each pivot arm having an end connected to an end of the pin to sandwich the hook plate between the pivot arms. A drive member is centrally located between the pair of pivot arms and connected to an end of each pivot arm opposite the end connected to the pin.

Thus, latches in accordance with the present invention can provide a latch mechanism having a thin package. Such latches can also provide a long reach to grab the striker. Additionally, such latches can be particularly well suited for use with low roof-to-header approach angles. These low approach angles are often found in hard top convertible roofs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a top diagrammatic view of the left side latch assembly of FIG. 4 illustrated in a latched position;

DETAILED DESCRIPTION OF THE PREFERRED EMBODIMENTS

Figure 1:
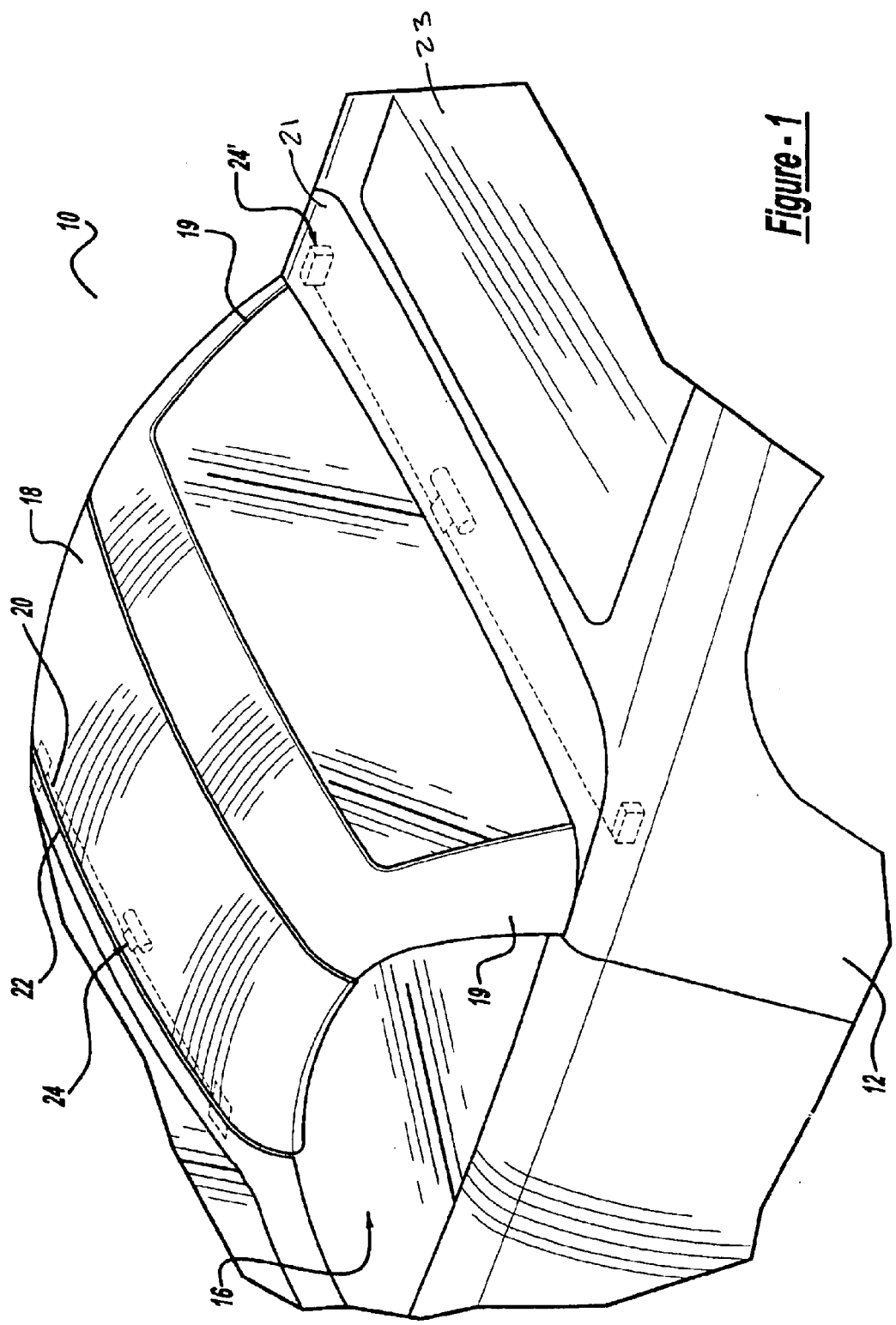
FIG. 1 is a fragmentary perspective view of an automobile with a convertible top using preferred latch mechanisms of the present invention.

The following description of the preferred embodiments is merely exemplary in nature and is in no way intended to limit the invention, its application, or uses. For example, although the engagement member is illustrated in the drawings as being attached to the windshield header while the latch assemblies are attached to the convertible roof header, the relative positions of these components may be reversed.

Referring to FIG. 1, a convertible passenger vehicle 10 has a body 12 and a vehicle passenger compartment 16. To vehicle passenger compartment 16 can be selectively opened and closed by an articulated convertible top 18 that is raised and lowered manually, or by a conventional hydraulic or electric motor power mechanism, not shown. In its raised position, top 18 has a transverse number one roof bow 20 that is secured to an upper transverse windshield header 22 by a latch mechanism, generally designated 24. In addition, a second latch mechanism 24' is utilized to secure top 18 to the body 12 at the base of its rear rails or C-pillars 19 or alternatively, to automatically secure a storage compartment such as a tonneau cover 21 or trunk lid 23 to the adjacent body panel 12. Since latch mechanisms 24 and 24' are substantially identical, only latch mechanism 24 is described below.

Figure 2:
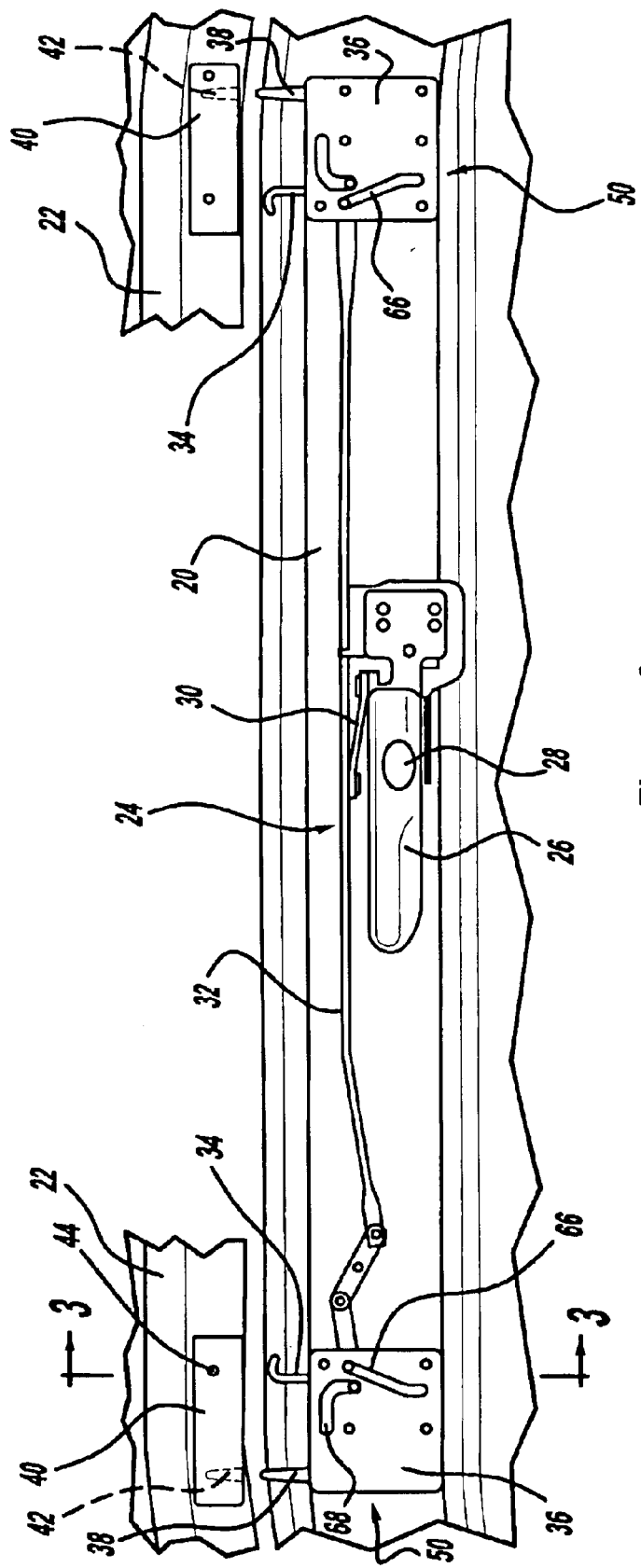
FIG. 2 is a fragmentary bottom plan view of the preferred latch mechanism of FIG. 1 attached to the convertible top header and the windshield header.

Referring to FIG. 2, a more detailed view of latch mechanism 24 is provided. Latch mechanism 24 is illustrated attached to the roof number one roof bow 20 and generally includes a single, centrally located actuating mechanism which, in this case, is a manually operated handle 26. Handle 26 includes a locking mechanism which retains handle 26 in the locked position until manually actuated by a thumb button 28. Handle 26 is connected through linkage 30 to main drive rod 32 which in turn actuates hooks 34 associated with two plates 36 also attached to plates 36 are alignment pins 38.

Cooperating latch mechanism components 40 are attached to windshield header 22. For example, locating recesses 42 are positioned on windshield header 22 and adapted to cooperate with the alignment pins 38 to accurately align windshield header 22 with the number one roof bow 20 for the latching and sealing operation. In addition, engagement members 44 are positioned on windshield header 22 to cooperate with hooks 34 to latch the windshield header 22 and roof bow 20 together.

Figure 3:
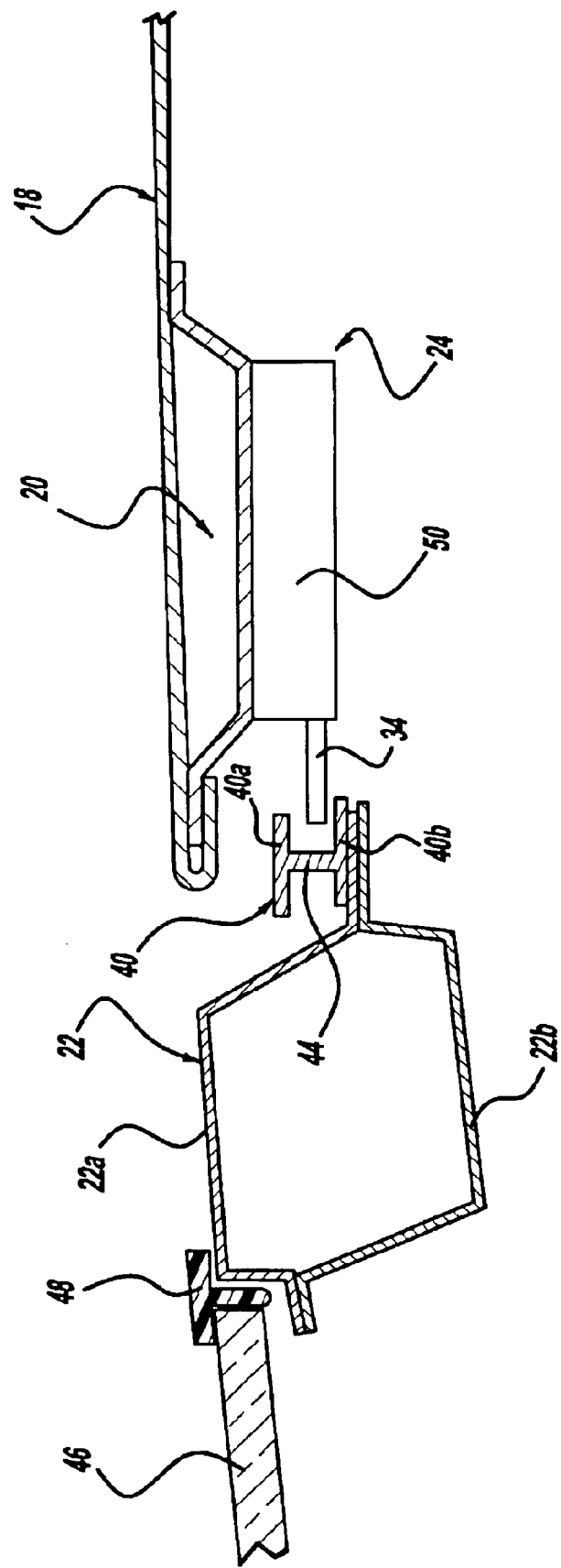
FIG. 3 is a fragmentary cross-sectional view taken along line 3—3 of FIG. 2.

Referring to FIG. 3, engagement members 44 (or strikers) include upper 40a and lower 40b plate members joined by a generally vertical pin to form a "H" shaped cross section to provide additional rigidity. Lower plate 40b is attached to a seam of the upper 22a and lower 22b windshield header components to provide additional support. Additional rigidity may alternatively be provided by also tying upper plate 40a into windshield header 22. At the left side of windshield header, the windshield 46 and seal 48 are illustrated. Also illustrated is the attachment of latch mechanism 24 to number one roof bow 20 of the hardtop roof 18. A rubber gasket or other seal member (not shown) is utilized to provide a seal between hardtop roof 18 and windshield header 22.

Figure 4:
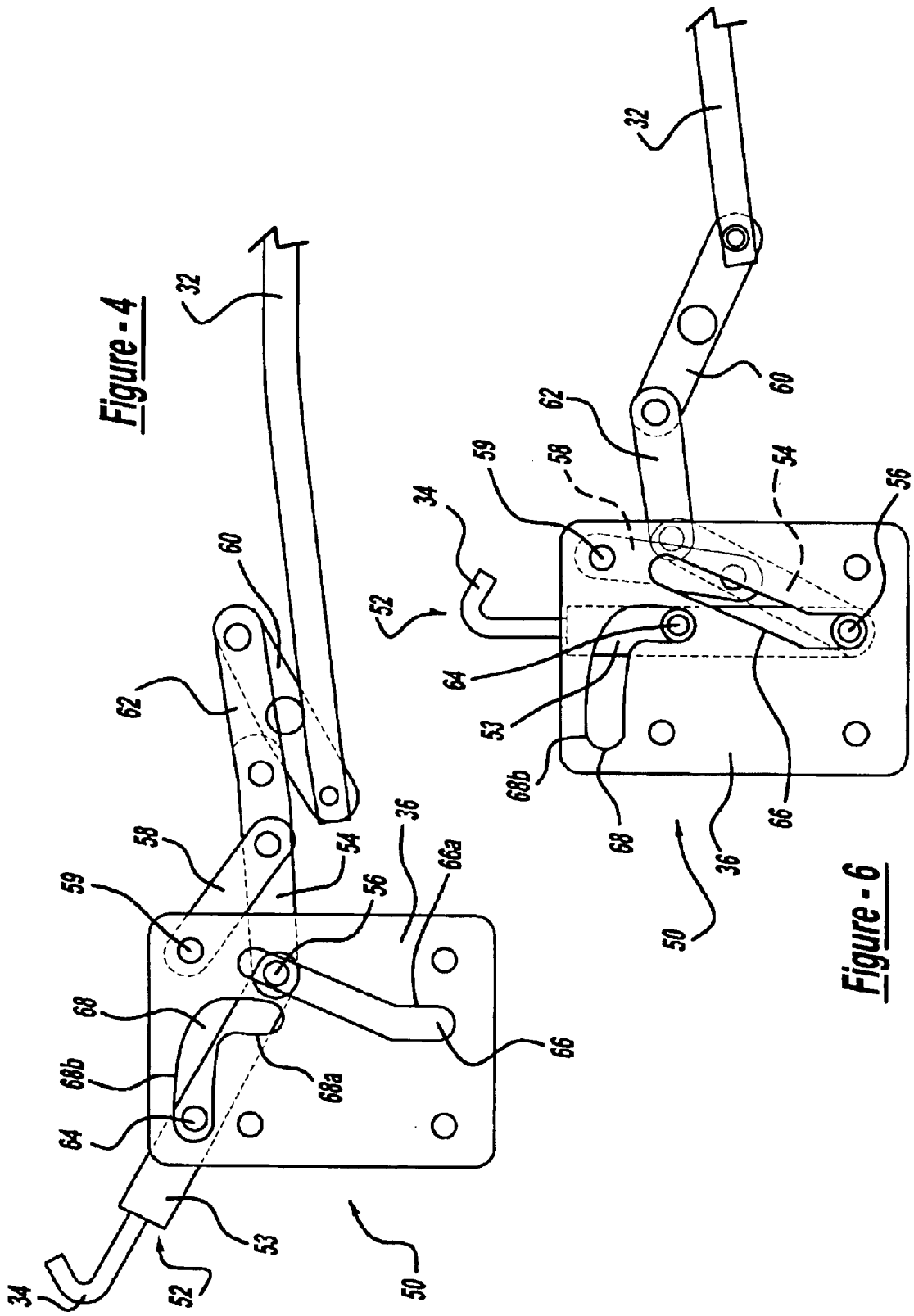
FIG. 4 is a top diagrammatic view of another preferred latch assembly for the left side illustrated in an unlatched position.
Figure 5:
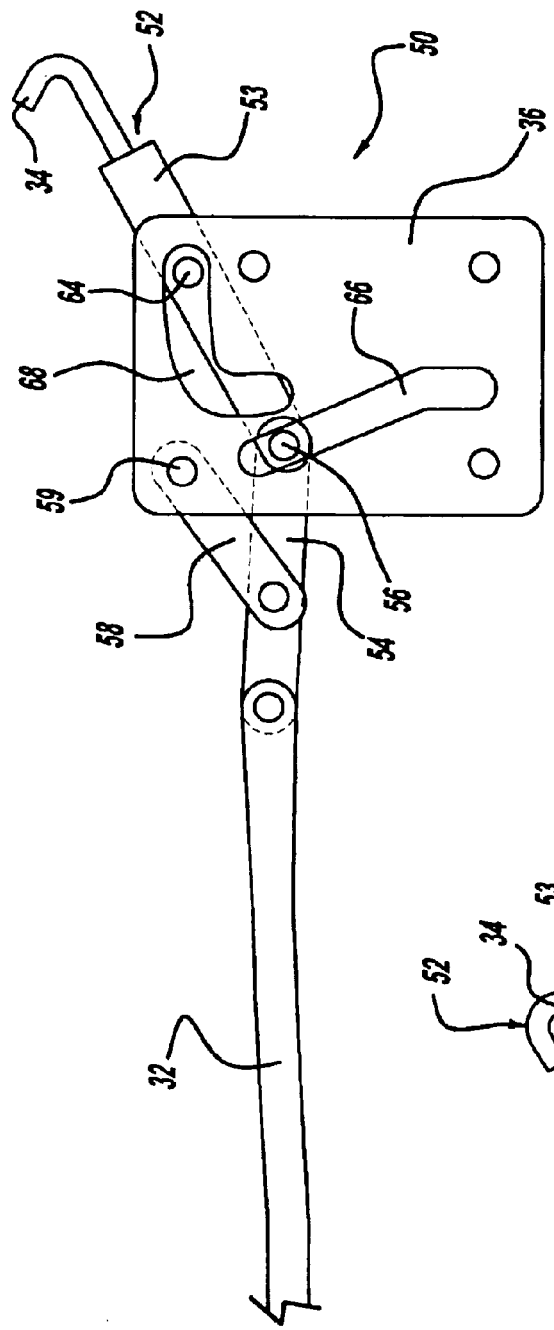
FIG. 5 is a top diagrammatic view of a preferred latch assembly for the right side and illustrated in the open position and useful in a latch mechanism including the left side latch assembly of FIG. 4.

Referring to FIGS. 4 and 5, preferred right and left latch assemblies 50 (without the alignment pin 38 and cooperating alignment recess 42) of latch mechanism 24 are illustrated in an unlatched position. Each latch assembly 50 includes an elongated hook member 52 (including hook 34). In this case, the hook member 52 includes a J-hook 34 adjustably mounted in an elongated rod member 53. As used herein, the term "hook" may include any member capable of capturing or otherwise engaging a cooperating engagement member for latching. Preferably, the hook is in the shape of any commonly defined hook shape; and more preferably in the shape of a J-hook.

The adjustable mounting of the J-hook 34 is accomplished utilizing cooperating threads (not shown) and a transverse threaded pin locking member (not shown) to lock the adjusted hook 34 against rotation. The rod member 53 is generally square in cross-section at the end with the hook 34, and at the opposite end includes a centrally located slot (not seen) creating two arms. This permits a drive member 54 of the drive mechanism to be centrally attached to the rod member 53 via a guide pin 56 such that substantially no torque is transferred between the drive member 54 and the rod member 53 as a result of the drive mechanism during latching and unlatching operations.

Similarly, a pair of pivot arms 58 of the drive mechanism pivot about stationary pivot pin 59 and are attached to the upper and lower sides at a midpoint of drive member 54. Additionally, drive member 54 is attached into a slot at the end of main drive rod 32 between two arms. Again, this substantially eliminates the introduction of torque as the latch assembly 24 is operated. The drive mechanism associated with the left latch assembly has a reversing drive feature, including a pivot arm 60 and a drive link 62 connected to the main drive rod 32. Preferably the connections between these components, 34, 60, 62, 58 also utilize the dual link or central slot arrangement for connections as described above to reduce torque transmission and provide added strength.

Figure 7:
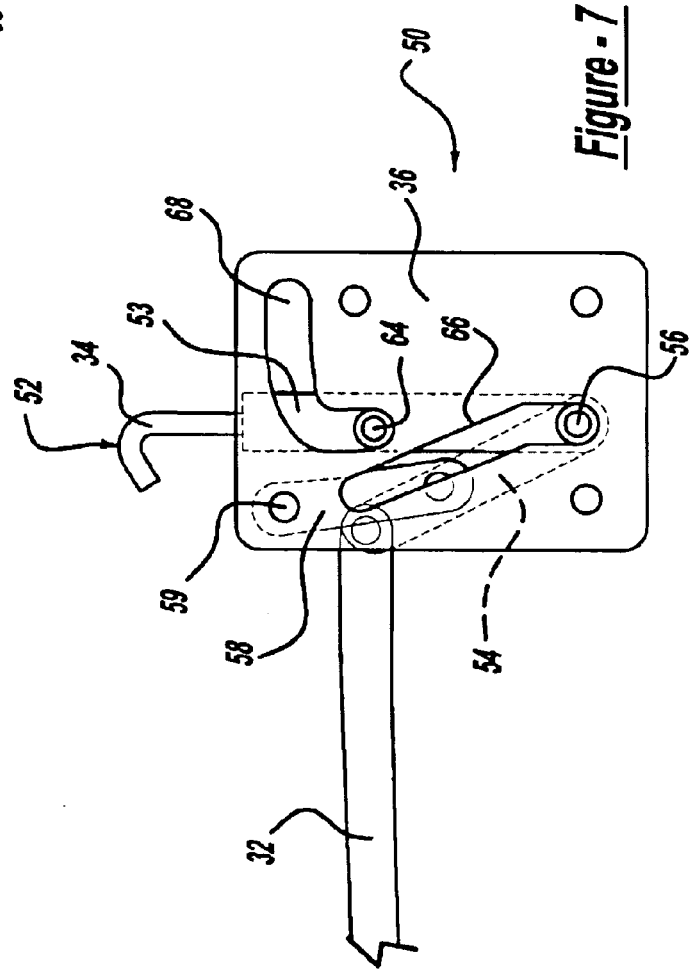
FIG. 7 is a top diagrammatic view of the right side latch assembly of FIG. 5 illustrated in a latched assembly.

FIGS. 6 and 7 illustrate the left and right latch assemblies 50 in a latched position. Guide pins 56, 64 and slots 66, 68 associated with the elongated hook member 52 cooperate to move the hook member 52 between latched and unlatched positions. A first and second slots 66, 68 are located in a pair of identical plate members 36 which sandwich the remaining latch assembly 50 components therebetween (as seen, for example, with respect to the embodiment of FIG. 14). Each plate member 36 pair include the first and second slots 66, 68 to form pairs of cooperating first and second slots 66, 68. Guide pin 56 attaches drive member 54 to the end of elongated hook member 52 and also serves to guide the end along the first slot 66. A second guide pin 64 located at a midpoint of the rod member 53 guides the midpoint along the second slot 68. Each of the first and second slots 66, 68 includes a segment 66a, 68a with a longitudinal axis which is substantially parallel to the longitudinal axis of the hook member 52 when it is in the latched position. Preferably, this segment 66a, 68a enable the hook member 52 to be brought directly back after initially engaging the engagement member 44, pulling the two components being joined together without lateral translation of the components relative to each other.

In addition, each of the first and second slots 66, 68 includes a segment 66b, 68b which diverges from the axis in opposite lateral directions away from the axis of the segments 66a, 68a. This serves to move the hook 34 laterally so that it clears the engagement member 44 without requiring lateral translation of the two components being joined while aligning the components for latching together. In addition, by having the two diverging segments 66b, 68b, the lateral movement of the hook 34 can be increased while reducing the lateral space required to accommodate such movement (since the end of the rod member 53 moves in the laterally opposite direction at guide pin 56). Thus, the guide slots 66, 68 and guide pins 56, 64 cooperate together under the influence of the drive mechanism (including drive link 54 and pivot arm pair 58) to move the elongated hook member 52 in a direction having a radial component and then in a direction along a longitudinal axis of the hook member 52.

Upon moving into the latched position, the dual pivot arms 58 have a general longitudinal axis which is substantially parallel to a longitudinal axis of the elongated hook member 52. The relevant longitudinal axis of the hook member 52 is preferably the longitudinal axis passing through the path the hook 34 takes upon engaging the engagement member 44. Thus, the longitudinal axis extends along the direction the components being joined are pulled together during the final part of the latching operation, without causing translation of the components relative to each other. In this embodiment, the relevant longitudinal axis preferably passes centrally through the aligned segments 66a, 68a of the guide slots 66, 68. Thus, it passed centrally through the guide pins 56, 64 when they are in the latched position. In cases where the hook member 52 includes a straight elongated rod member 53, the longitudinal axis preferably extends along the central longitudinal axis of the rod member 53. In addition, the dual pivot arms 58 are preferably under compression when in the latched position.

Figure 8:
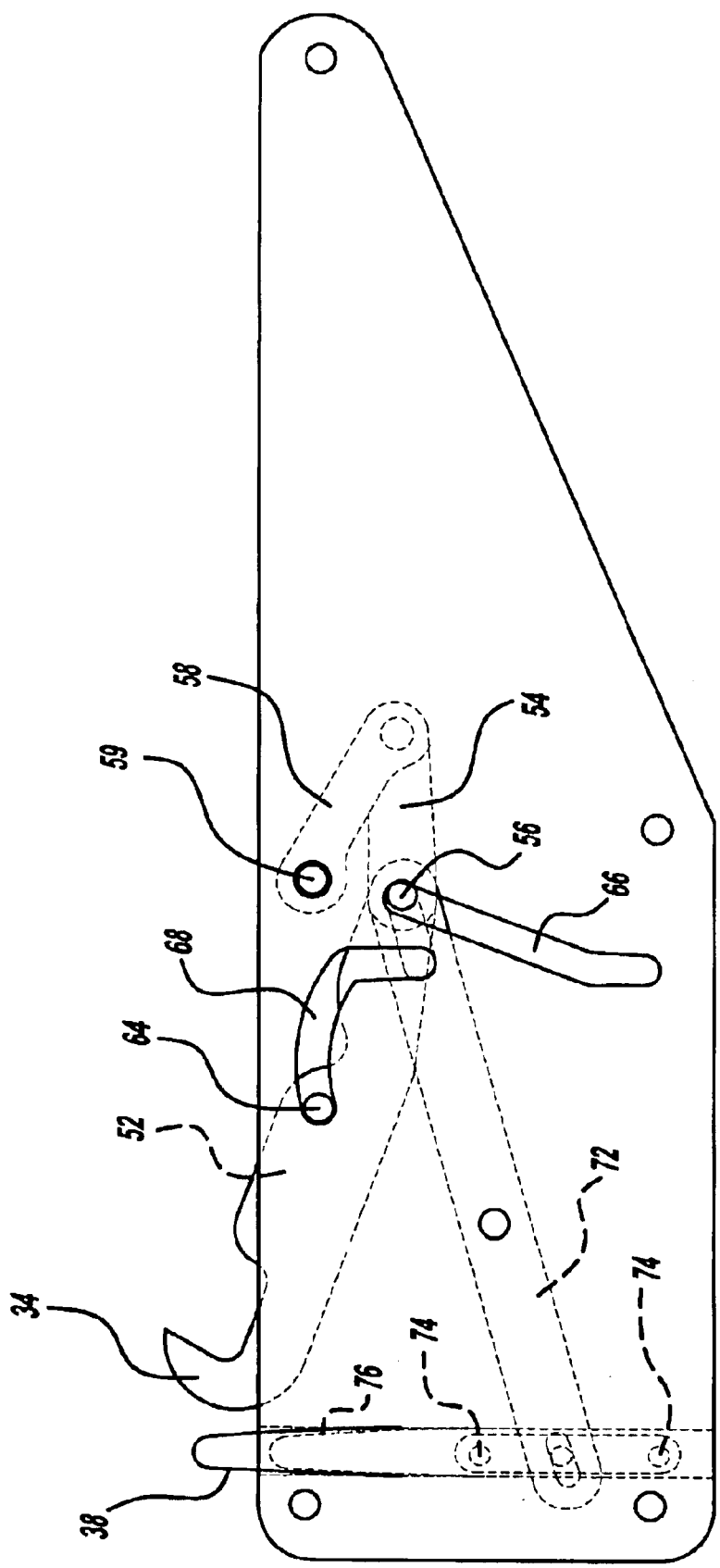
FIG. 8 is a top diagrammatic view, similar to FIG. 4, of another preferred left side latch assembly illustrated in an unlatched position.
Figure 9:
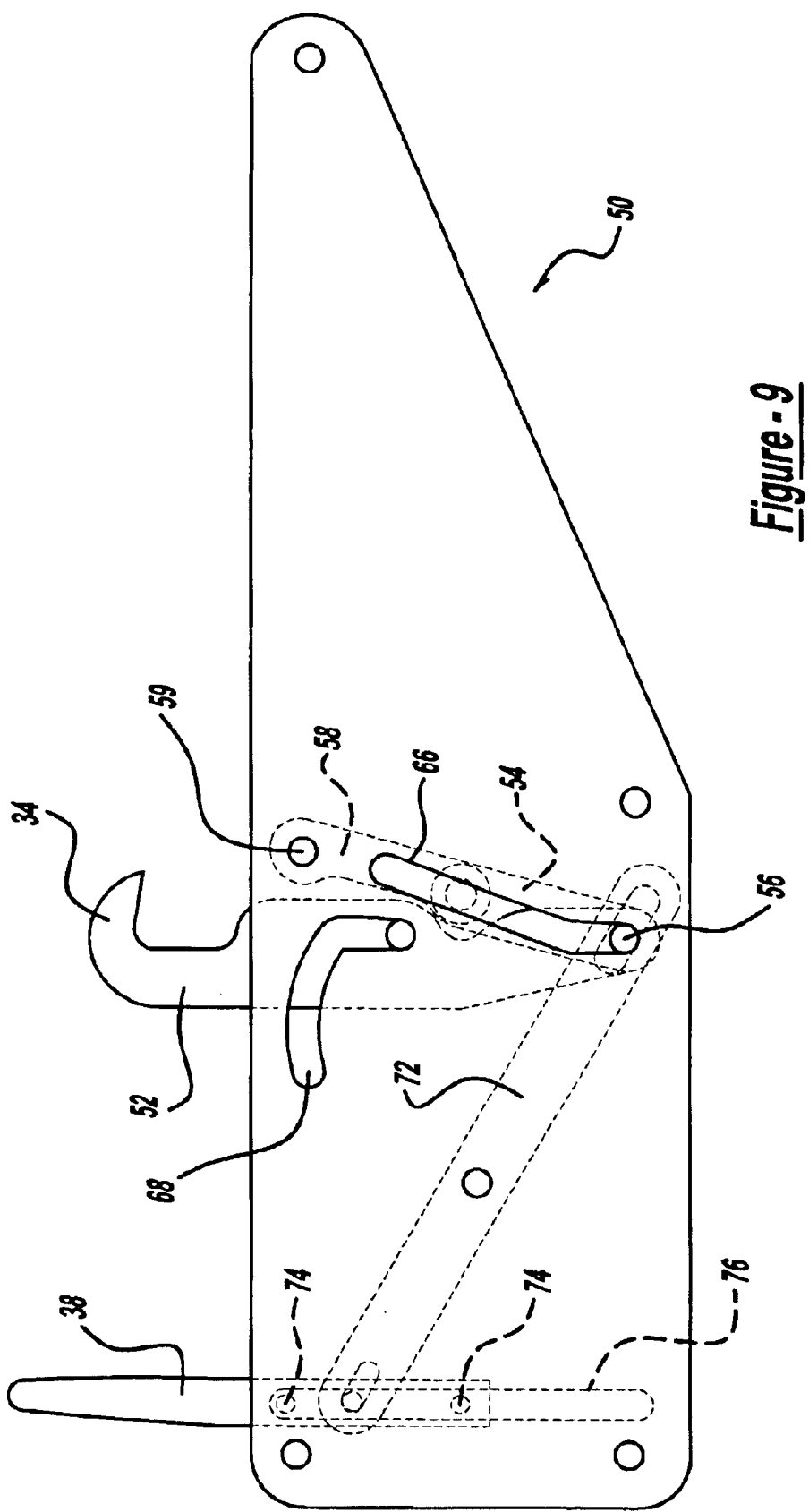
FIG. 9 is a top diagrammatic view of the preferred latch assembly of FIG. 8 illustrated in a latched position.

Referring to FIGS. 8 and 9, a second alternative preferred embodiment of a latch assembly 50 is illustrated. Many of the components of this embodiment are quite similar to those of the previous embodiment and identical reference numerals are utilized for these components. For example, dual pivot arms 58 connect to a drive link 54 which is connected by guide pin 56 to an end of the hook member 52 opposite to the hook 34. Guide pins 56 and 64 are associated with the two slot pairs 66, 68 in each of the upper and lower plates 36 to guide the hook member 52 between an unlatched and a latched position.

In this embodiment, the hook member 52 is made of a single, integral component. In addition, the upper and lower plates 36 are extended and a moving alignment pin 38 is provided. A pivot arm 72 is attached to the hook member 52 at one end and to the alignment pin 38 at its other end. The alignment pin 38 is maintained aligned along an axis parallel to the aligned segments 66a, 68a of slots (above) by guide pins 74 cooperating with a linear slot 76. Thus, as the hook member 52 is urged toward the latched position, the alignment pin 38 is axially extended. Similarly, the alignment pin 38 is retracted as the hook member 52 is urged toward the unlatched position. The alignment pin 38 cooperates with an alignment recess 42 adapted to cooperate with the alignment pin 38 to laterally align the convertible top 18 and an automobile component of the body 12 together.

Figure 10:
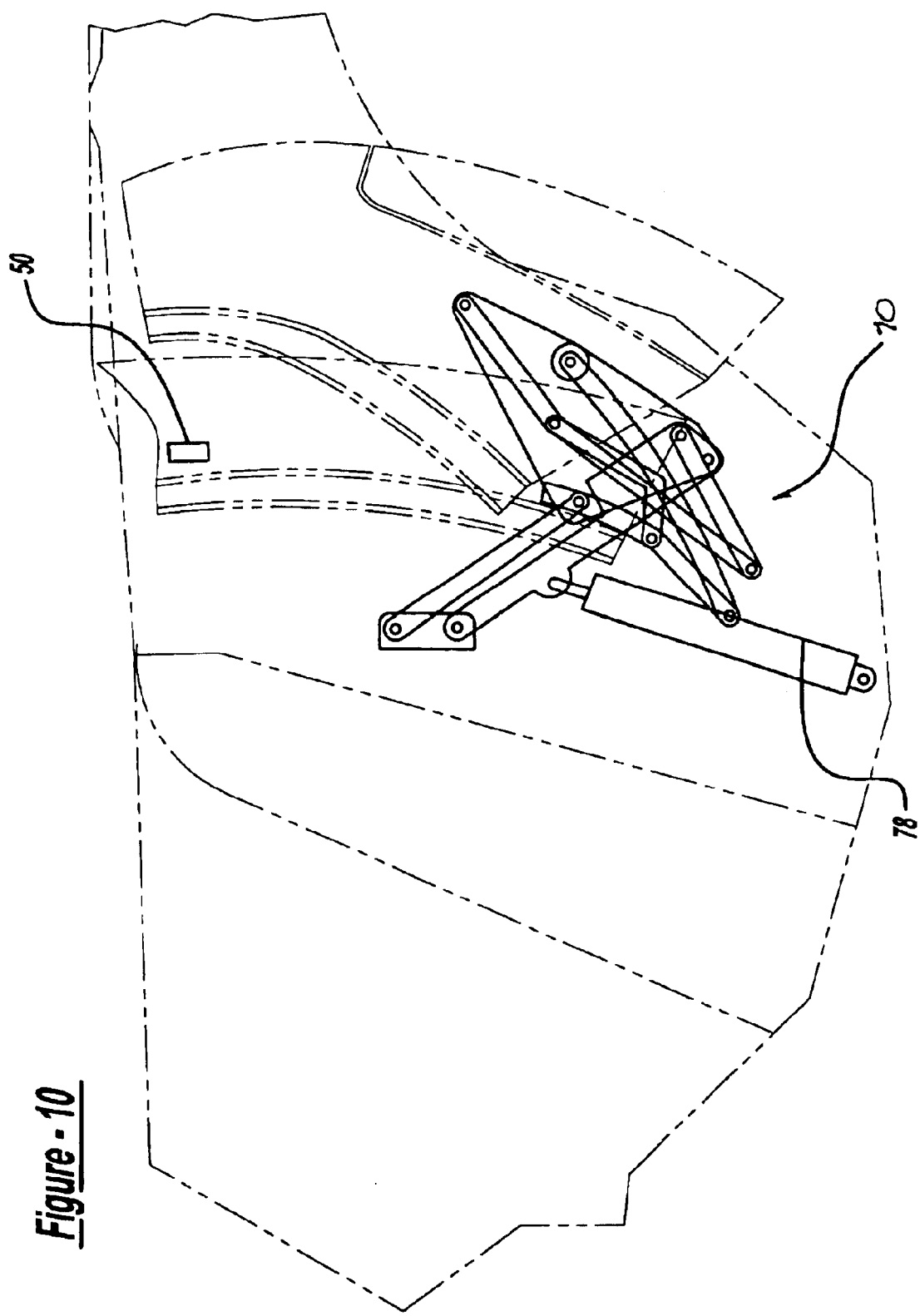
FIG. 10 is a fragmentary side view of a convertible hard top with its raising and lowering mechanism and incorporating a preferred latch assembly of the present invention.
Figure 11:
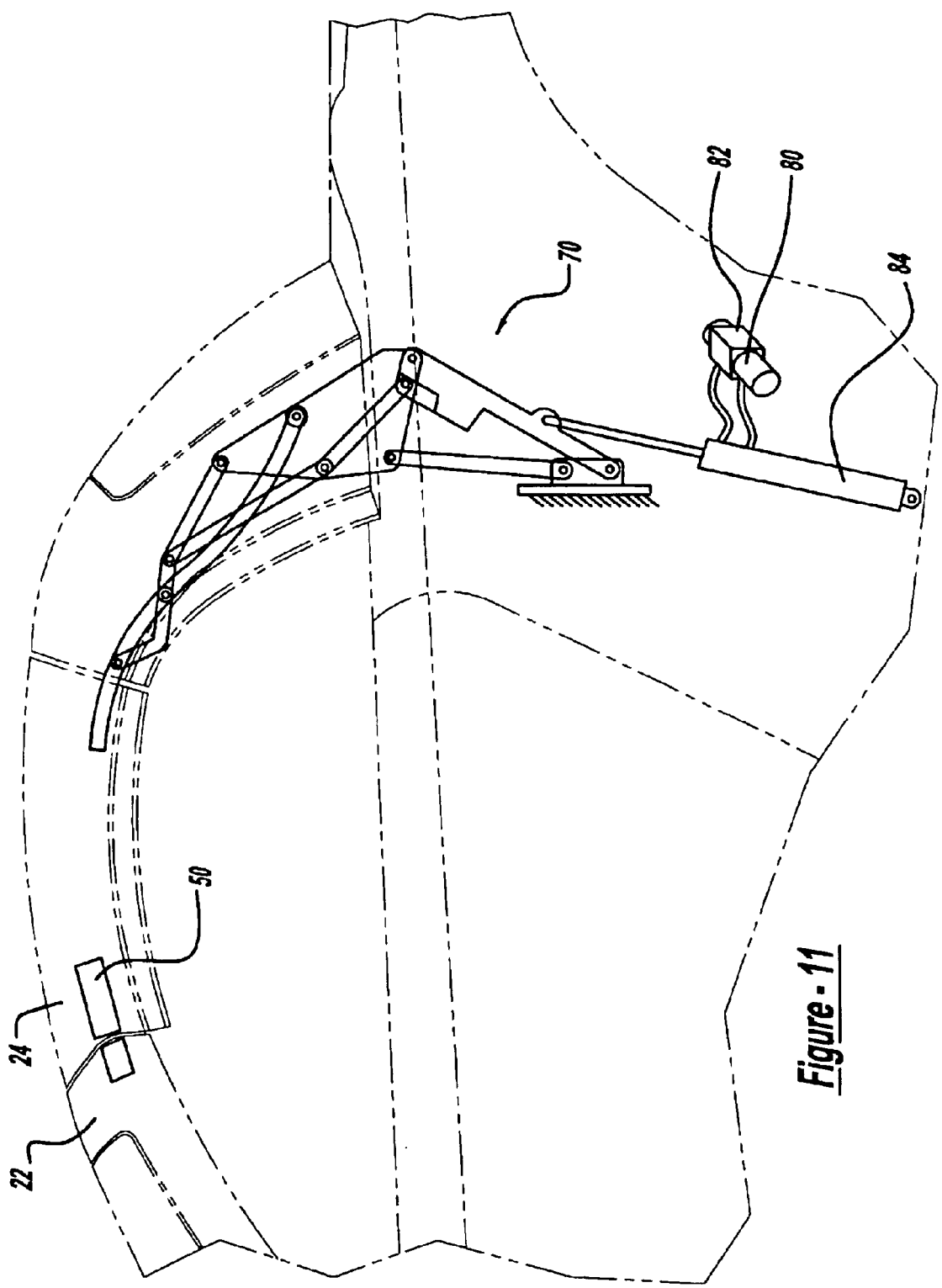
FIG. 11 is a fragmentary side view of the convertible hard top of FIG. 10 (but having a powered raising and lowering mechanism) in the raised position and the latch mechanism components latched together.

Referring to FIGS. 10 and 11, a latch assembly 50 of the present invention is illustrated in use with a convertible hard top 18. Any acceptable convertible hard-top roof raising and lowering mechanism 70 may be utilized. As seen in FIG. 10, the mechanism 70 may be manual, utilizing a pneumatic cylinder 78 which aids a user in manually lowering and raising the hardtop roof. One preferred system for raising and lowering the hard-top roof 18 is disclosed in U.S. Ser. No. 09/930,739, filed Aug. 15, 2001, entitled "Hard-top Convertible Roof System," and hereby incorporated herein by reference.

Alternatively, as seen in FIG. 11, an electric motor 80 driving a hydraulic pump 82 may provide powered operation to a hydraulic cylinder assembly 84 for raising and lowering the hard-top roof 18. The convertible hard top roof 18 is in the raised position and the latch mechanism 42 has been utilized to latch the hard top 18 to the windshield header 22. The latch assembly is attached to the hard top header. The latch assembly 50 cooperates with an engagement mechanism 44 of a cooperating member 40 located on the windshield header 22 as discussed previously. The alignment pin 38 retracts when the latch assembly 50 is in the unlatched position, thereby reducing necessary storage space.

Figure 12:
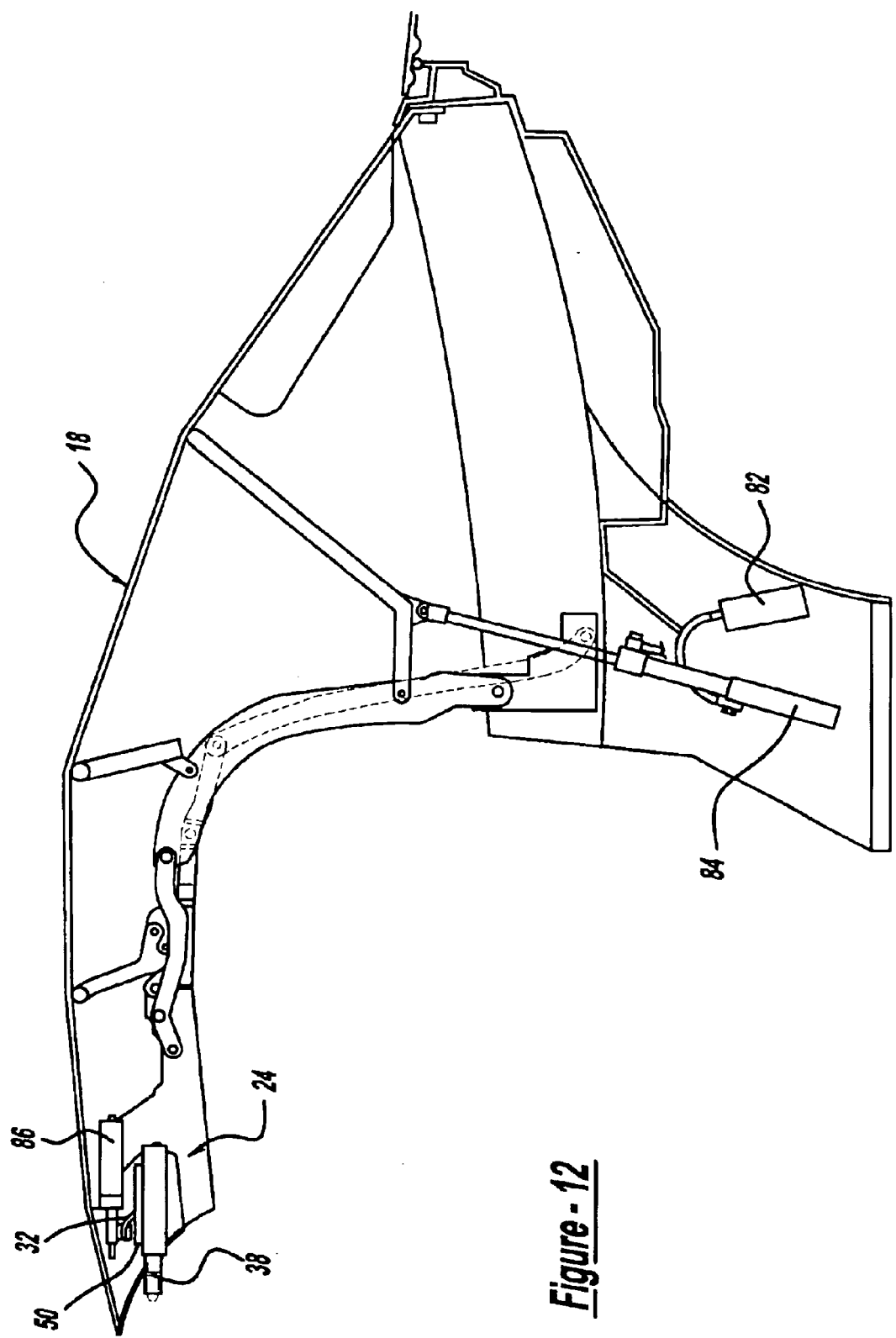
FIG. 12 is a fragmentary side view of a convertible soft top including a powered raising and lowering mechanism and a preferred powered latch assembly.

Referring to FIG. 12, a latch mechanism 24 of the present invention is illustrated in use with a soft convertible top 18. A powered hydraulic mechanism including a hydraulic pump 82 and a piston/cylinder assembly 84 raises the convertible top into position. A user aligns the top 18 and windshield header 22 by inserting the alignment pin 38 into a cooperating alignment recess 42 associated with the windshield header 22. One preferred alignment pin 38 and cooperating recess 42 is disclosed in U.S. Pat. No. 6,213,534 which issued to MacFarland on April 2001 and is hereby incorporated herein by reference. An electrically powered motor 86 is also provided as part of the drive mechanism for the latch mechanism 24. Once the alignment pin 38 has been appropriately located within the cooperating alignment recess 42, the electrically powered motor 86 of the drive mechanism operates to move a main drive rod 32 to move the latch assembly 50 into the latched position. The process is repeated in reverse for lowering the convertible top 18.

Figure 13:
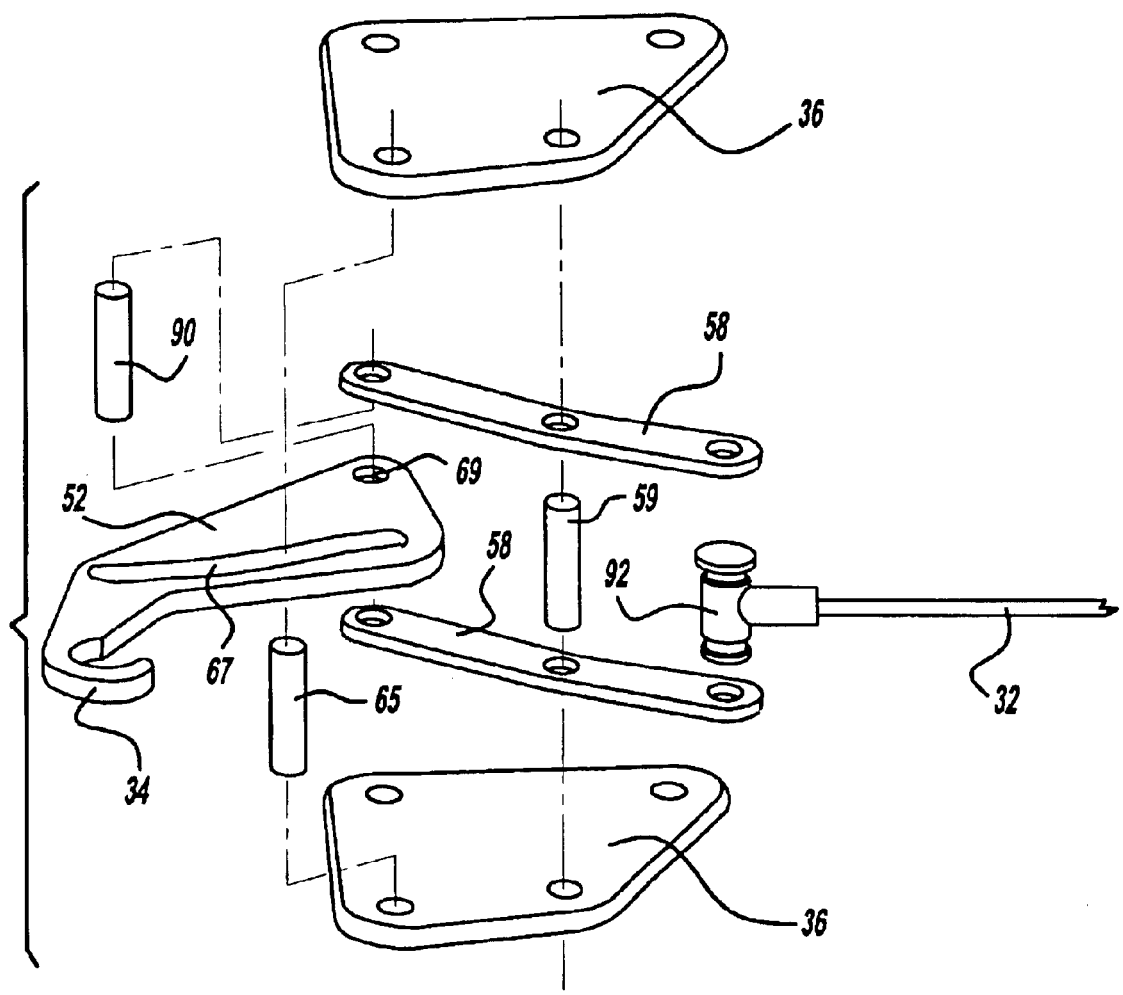
FIG. 13 is an expanded view of another preferred latch assembly of the present invention.

Referring to FIG. 13, a third preferred latch assembly 50 of a latch mechanism 24 is illustrated. The hook 34 of this latch assembly 50 is in the form of a plate hook member 52. The hook member 52 includes a guide slot 67 therein and an opening 69 for receiving a pin 90. The pin 90 connects dual pivot arms 58 to the hook member 52. The pivot arms 58 sandwich the hook member 52 between them to substantially eliminate the transfer of torque between the pivot arms 58 and the hook member 52. The pivot arms pivot around a pivot pin 59 centrally located on the pivot arms 58.

The other end of the pivot arms 58 are attached to the main drive rod 32 of the drive mechanism by a drive pin coupling member 92. Again, the main drive rod 32 is located centrally between the two pivot arms 58 for torque reduction purposes. A pivot pin 59 attaches a midpoint of the pivot arms 58 to the upper and lower plates 36 to create a pivot point. A guide pin 65 passes through the guide slot 67 and is attached to the upper and lower plates 36. Additional pins (not seen) connect the upper and lower plates 36 together in spaced relation.

Figure 14:
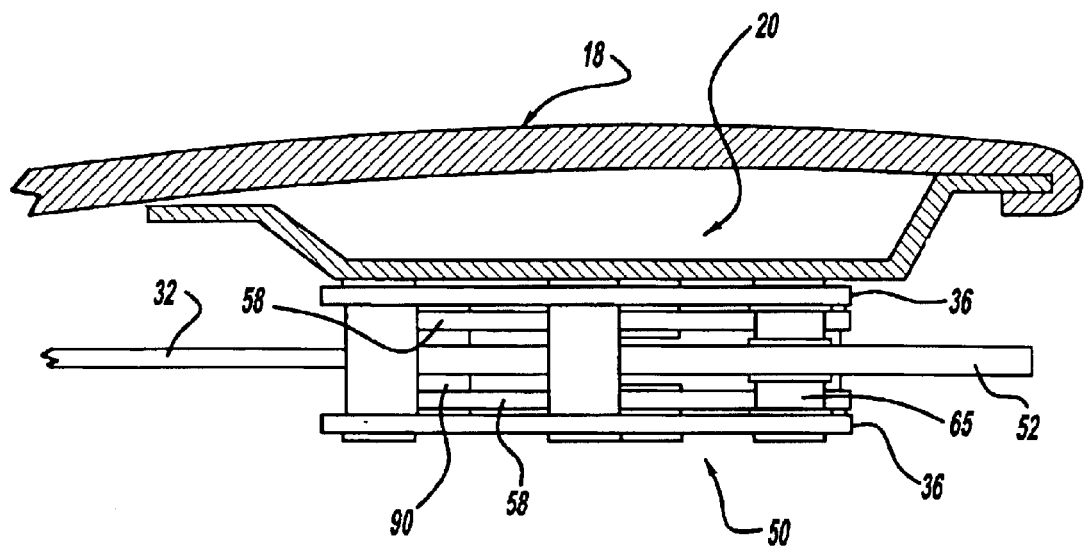
FIG. 14 is a partial cross-sectional view of the latch assembly of FIG. 14 attached to the convertible top header.

Referring to FIG. 14, this third preferred latch assembly 50 is illustrated attached to a number one roof bow 20 of a convertible top 18. The centralized location of the main drive rod 32, and the hook member 52 between the pair of pivot pins 58, is best visible in this view. It is preferable that there is a meaningful distance between the upper and lower pivot arms 58. This helps add stability to the latch assembly 50. Preferably, the distance between the upper and lower pivot arms 58 is at least about 50 mm; more preferably, at least about 60 mm; and even more preferably, at least about 80 mm. In addition, to help provide added strength the minimal thickness of each pivot arm 58 is preferably at least about 12 mm; and more preferably, at least about 17 mm.

Figure 15:
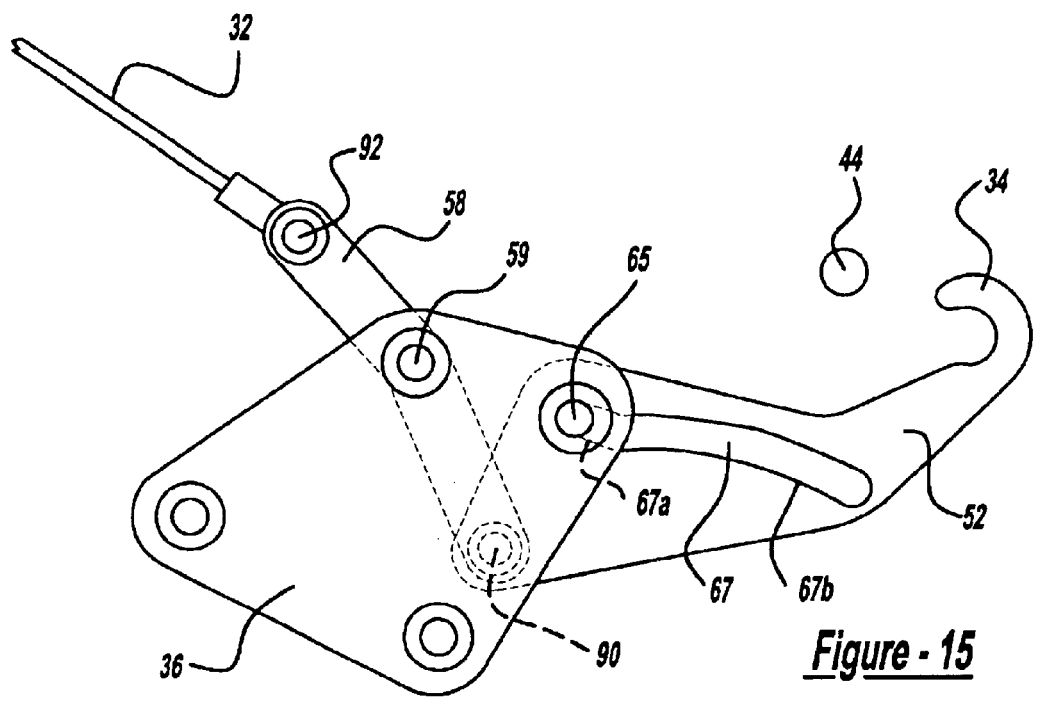
FIG. 15 is a top plan view of the right side latch assembly of FIG. 13 in an open position.

Referring to FIG. 15, the latch assembly is illustrated in an unlatched position. In this position, the hook 34 of the hook member 52 is laterally located relative to engagement member 44. The lateral location is such that the convertible top number one roof bow 20 with the latch assembly 50 and the windshield header 22 with the engagement member 44 may be positioned for latching without requiring lateral translation of the roof bow 20 and header 22 relative to each other. Hook 34 is moved into this lateral location as a result of a segment 67a of the guide slot 67 extending in a direction at an angle relative to the arched segment 67b of the guide slot 67.

Figure 16:
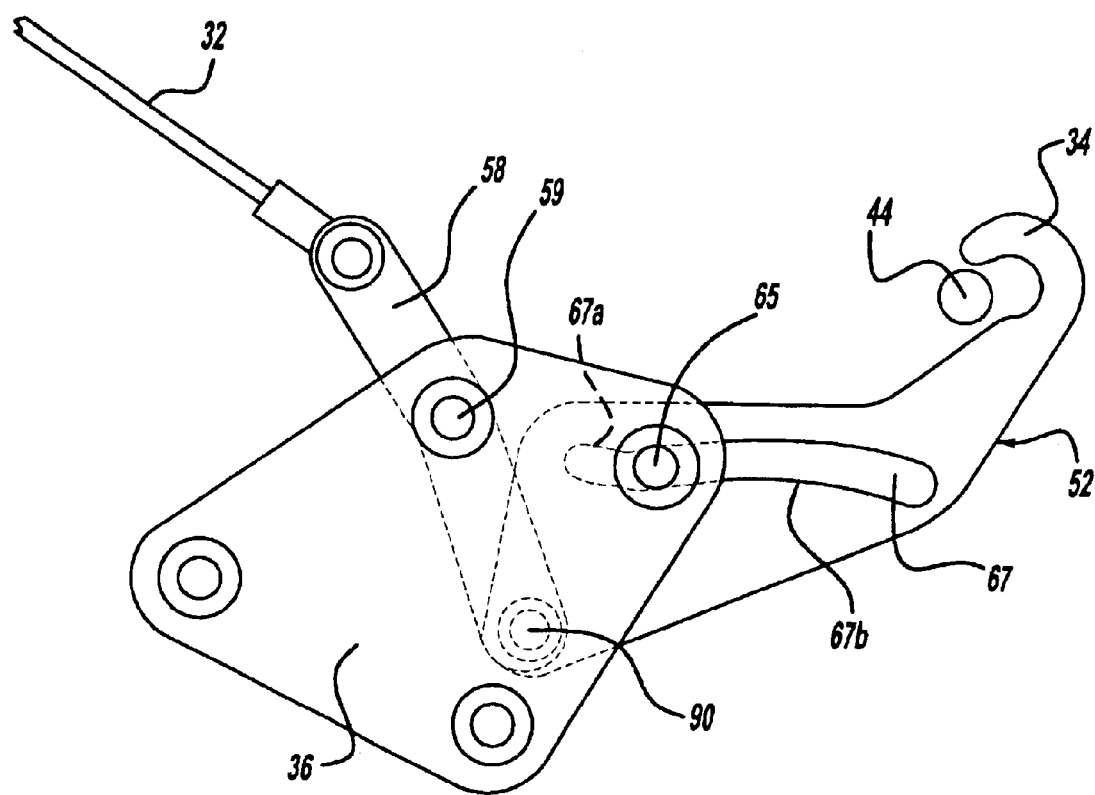
FIG. 16 is a top diagrammatic view similar to FIG. 15, but with the right side latch assembly in a position between the fully unlatched position and the fully latched position.
Figure 17:
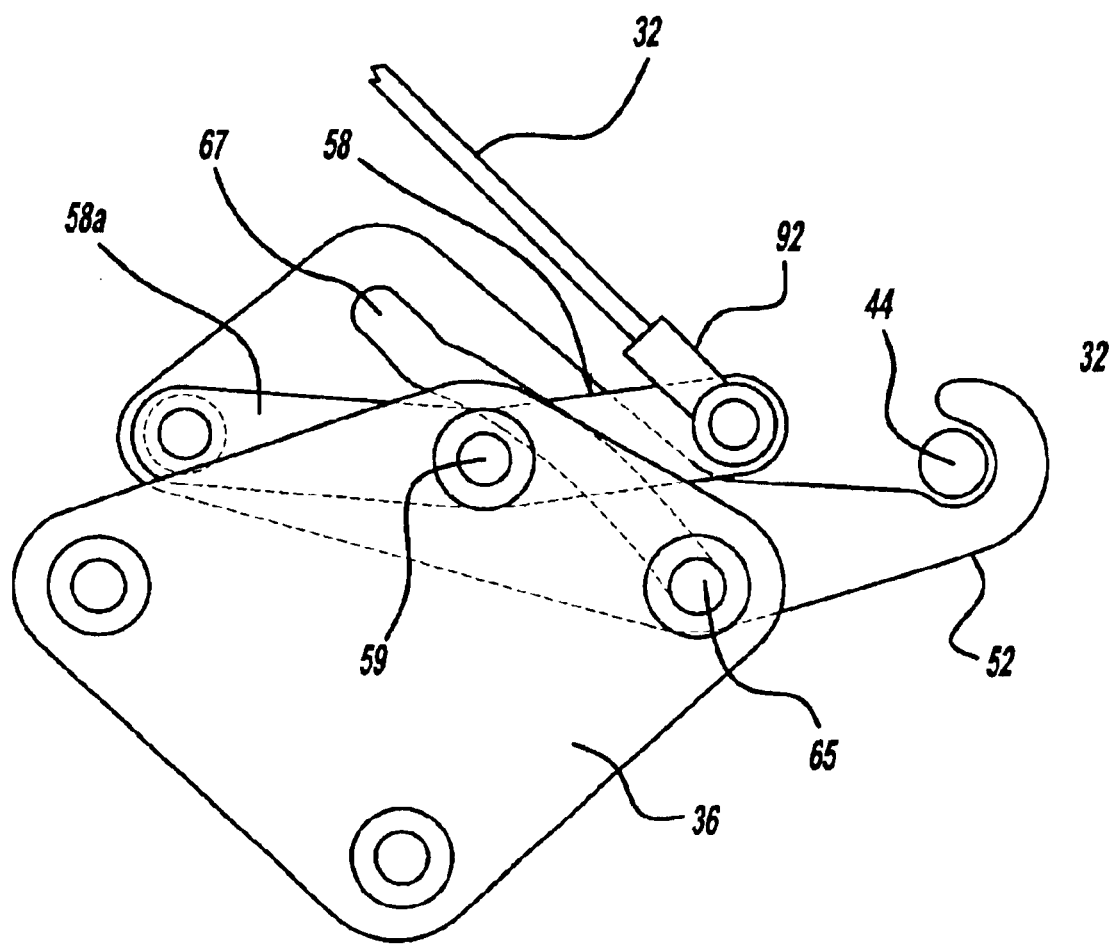
FIG. 17 is a top diagrammatic view similar to FIG. 15, but illustrating the right side latch assembly in a latched position.

Referring to FIGS. 16 and 17, the arched segment 67b of the guide slot 67 is adapted to cooperate with the dual pivot arms 58 and guide pin 65 to move the hook 34 toward the remainder of the assembly 50 while causing substantially no lateral movement relative thereto. The dual pivot arms 58 are slightly angled to cause the pivot arms 58 to move to an overcenter position when the latch assembly 50 is in a latched position. To move the latch assembly 50 toward the unlatched position, the drive mechanism must first overcome the overcenter arrangement. During unlatching, the arched segment 67b of the guide slot 67 is adapted to move the hook 34 directly away from the remainder of latch assembly 50 without lateral translation thereof. The angled segment 67a of the guide slot 67 then is adapted to move the hook 34 laterally; thereby allowing the number one roof bow 20 and windshield header 22 to be moved apart without requiring lateral translation of the roof bow 20 and header 22 with respect to each other.

In the latched position as seen in FIG. 17, the dual pivot arms 58 each include a segment 58a having a central longitudinal axis which is substantially parallel to an axis of the hook member 52. The relevant axis of the hook member 52 is the axis passing through the path the hook 34 takes upon engaging the engagement member 44 and having substantially no relative lateral translation of the components. Thus, the axis extends in the direction the roof bow 20 and header 22 are pulled together during the final part of the latching operation, without causing translation of the roof bow 20 and header 22 relative to each other. Preferably, a longitudinal axis of the aligned dual pivot 58 members is substantially parallel to the axis of the hook member 52 as described above such that there is about 10 degrees or less difference between them; more preferably, about 8 degrees or less; and even more preferably, about 5 degrees or less.

In addition, this segment is preferably under compression, when in the latched position. It is preferable that there is a meaningful distance between the upper and lower pivot arms 58. This helps add stability to the latch assembly 50. Preferably, the distance between the upper and lower pivot arms 58 is at least about 50 mm; more preferably, at least about 60 mm; and even more preferably, at least about 80 mm. In addition, to help provide added strength the minimal thickness of each pivot arm 58 is preferably at least about 12 mm; and more preferably, at least about 17 mm.

Many modifications are possible to the various embodiments described herein. For example, the slot pairs 66, 68 of FIG. 2 in each of the outer plate members 36 may be placed on a plate hook member 52 similar to that of FIG. 13, and visa-versa. It is sufficient that the guide slot and guide pins be associated with the hook member to provide the desired movement. In addition, the terms "first" and "second" as used herein are intended merely to differentiate between two similar components and does not indicate any relative importance between these components. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible top latch mechanism comprising:
   a hook;
   a first guide pin and a second guide pin, the first and second guide pins being associated with the hook;
   a first guide slot in a substantially planar member associated with the first guide pin and a second guide slot in the substantially planar member and separate from the first guide slot and associated with the second guide pin; each of the first and second guide slots having a segment which is substantially aligned along an axis of the hook in the latched position, the first guide slot having an additional segment extending in a lateral direction away from the axis, the second guide slot having an additional segment extending in a lateral direction away from the axis and laterally opposite the first guide slot; and
   a drive mechanism adapted to move each of the first and second guide pins along its respective first and second guide slot to move the hook between a latched position and an unlatched position.

2. A latch mechanism according to claim 1, wherein the hook is a plurality of hooks, and the drive mechanism is adapted to move the plurality of hooks between a latched and an unlatched position.

3. A latch mechanism according to claim 2, further comprising a handle associated with the drive mechanism to enable manual operation of the plurality of hooks between the latched position and the unlatched position.

4. A latch mechanism according to claim 2, wherein the drive mechanism further comprises a reversing mechanism.

5. A latch mechanism according to claim 1, further comprising an alignment pin associated with one of a convertible top and a automobile component, and an alignment recess associated with the other of the convertible top and the automobile component, the alignment recess being adapted to cooperate with the alignment pin to laterally align the convertible top and the automobile component together.

6. A latch mechanism according to claim 5, wherein an engagement member adapted to cooperate with the hook and the alignment recess are associated with a windshield header and wherein the hook and the alignment pin are associated with a convertible top roof bow.

7. A latch mechanism according to claim 1, wherein the drive mechanism has a pair of pivot arms aligned, spaced apart and adapted to accommodate a drive link centrally located between the pair of pivot arms, the drive link being attached to each of the pivot arms.

8. A latch mechanism according to claim 7, wherein the pair of pivot arms have a longitudinal axis which is substantially parallel to a central axis of the hook when the latch mechanism is in the latched position.

9. A latch mechanism according to claim 1, wherein the hook has a midpoint and a distal end, and wherein the first guide pin is associated with the midpoint of the hook and the second guide pin is associated with the distal end of the hook.

10. A latch mechanism according to claim 1, wherein an engagement member adapted to cooperate with the hook is attached to a windshield header and wherein the hook is attached to a convertible top.

11. A convertible top system comprising:
   (a) an engagement member associated with one of a convertible top and an automobile component;
   (b) a latch assembly associated with the other of the convertible top and the automobile component, the latch assembly having:
      (i) an elongated hook member having a midpoint, a distal end and a longitudinal axis;
      (ii) a first guide pin associated with the midpoint and a second guide pin associated with the distal end,
      (iii) a first and a second plate member spaced apart and accommodating the hook member between the first and second plate members, each plate member having a non-vertical orientation and having a first guide slot cooperating with a first guide slot in the other plate member and a second guide slot cooperating with a second guide slot in the other plate member, each of the first and second guide slots having a segment which is substantially aligned along a longitudinal axis running through the hook in the latched position, the first guide slots having an additional segment extending in a lateral direction away from the longitudinal axis, the second guide slots having an additional segment extending in a lateral direction away from the longitudinal axis and opposite to the first guide slot, the first guide pin extending into the first guide slots and the second guide pin extending into the second guide slots; and (c) a drive mechanism associated with the latch assembly and adapted to drive each of the guide pins along its respective guide slot and move the hook between a latched and an unlatched position.

12. A convertible top system according to claim 11, wherein the drive mechanism of the latch assembly is coupled to a drive mechanism of a second latch assembly.

13. A convertible top system according to claim 12, further comprising a handle coupled to the drive mechanism to enable manual operation of the coupled latch mechanisms between the latched position and the unlatched position.

14. A convertible top system according to claim 12, wherein the drive mechanism of one of the latch mechanisms further comprises a reversing mechanism.

15. A convertible top system according to claim 11, further comprising an alignment pin associated with one of the convertible top and the automobile component, and an alignment recess associated with the other of the convertible top and the automobile component, the alignment recess being adapted to cooperate with the alignment pin to laterally align the convertible top and the automobile component together.

16. A convertible top system according to claim 15, wherein the engagement member and the alignment recess are associated with a windshield header and wherein the latch assembly and the alignment pin are associated with a convertible top roof bow.

17. A convertible top system according to claim 11, wherein the drive mechanism has a pair of pivot arms aligned, spaced apart and adapted to accommodate a drive link centrally located between the pair of pivot arms, the drive link being attached to each of the pivot arms.

18. A convertible top system according to claim 17, wherein the pair of pivot arms have a longitudinal axis which is substantially parallel to a central axis of the hook when the latch mechanism is in the latched position.

19. A convertible top system according to claim 11, wherein the engagement member is associated with a windshield header and wherein the latch assembly is associated with a convertible top roof bow.

20. A convertible top latch mechanism comprising:

a hook associated with a guide slot and a guide pin, the guide slot and guide pin being adapted to cooperate to guide the hook in a direction having a radial component and then in a linear direction along an axis corresponding to a linear portion of a path the hook takes without causing relative transverse movement between a convertible top and an automobile component as the hook is moved from an unlatched to a latched position; and a drive mechanism adapted to drive the guide pin along the guide slot, the drive mechanism having a pair of elongated pivot arms aligned, spaced apart and adapted to accommodate a drive link centrally located between the pair of pivot arms and attached to each of the pivot arms, the pair of pivot arms having a longitudinal axis, when the latch mechanism is in the latched position, which is substantially parallel to the linear direction.

21. A convertible top latch mechanism according to claim 20, wherein the hook is a plurality of hooks and the drive mechanism is adapted to drive the plurality of hooks between the latched and the unlatched position.

22. A convertible top latch mechanism according to claim 21, further comprising a handle associated with the drive mechanism to enable manual operation between the latched position and the unlatched position.

23. A convertible top latch mechanism according to claim 21, wherein the drive mechanism further comprises a reversing mechanism.

24. A convertible top latch mechanism according to claim 20, wherein the pivot arms are under compression along the longitudinal axis when in the latched position.

25. A convertible top latch mechanism according to claim 20, wherein an engagement member adapted to cooperate with the hook is attached to a windshield header and wherein the hook is attached to a convertible top.

26. A convertible top latch mechanism according to claim 20, wherein an angle between the longitudinal axis of the pivot arms and the linear direction is less than about 10 degrees when in the latched position.

* * * * *

UNITED STATES PATENT AND TRADEMARK OFFICE
CERTIFICATE OF CORRECTION

PATENT NO. : 6,758,511 B2 Page 1 of 1
DATED : July 6, 2004
INVENTOR(S) : Kim E. Taylor, Michael T. Willard, Michael P. Alexander and Stephen A. Doncov It is certified that error appears in the above-identified patent and that said Letters Patent is hereby corrected as shown below:

<u>Title page,</u>
Item [57], ABSTRACT,
Line 2, "a" should be -- an --.

<u>Column 1,</u>
Line 23, (second occurrence), "a" should be -- an --.

<u>Column 3,</u>
Line 23, "36 also" should be -- 36. Also --.

<u>Column 8,</u>
Line 19, "a" should be -- an --.

Signed and Sealed this

Fourteenth Day of December, 2004

JON W. DUDAS
*Director of the United States Patent and Trademark Office*